United States Patent
Dreano

(10) Patent No.: US 7,568,581 B2
(45) Date of Patent: Aug. 4, 2009

(54) STACKING UNIT COMPRISING AT LEAST ONE CHAMBER FOR HOUSING A FOOD PRODUCT SUCH AS HAM

(75) Inventor: Claude Dreano, Mauron (FR)

(73) Assignee: Armor Inox SA, Mauron (FR)

( * ) Notice: Subject to any disclaimer, the term of this patent is extended or adjusted under 35 U.S.C. 154(b) by 923 days.

(21) Appl. No.: 10/504,470

(22) PCT Filed: Feb. 13, 2003

(86) PCT No.: PCT/FR03/00472

§ 371 (c)(1),
(2), (4) Date: Aug. 24, 2004

(87) PCT Pub. No.: WO03/067993

PCT Pub. Date: Aug. 21, 2003

(65) Prior Publication Data

US 2005/0172828 A1   Aug. 11, 2005

(30) Foreign Application Priority Data

Feb. 14, 2002 (FR) .................................. 02 02050

(51) Int. Cl.
   *B65D 21/032* (2006.01)
   *B65D 21/02* (2006.01)
(52) U.S. Cl. .................... 206/503; 206/511; 206/518; 206/519
(58) Field of Classification Search ................ 206/503, 206/518, 509–512, 519, 564; 220/507
See application file for complete search history.

(56) References Cited

U.S. PATENT DOCUMENTS 2,585,428 A * 2/1952 Bitney ........................ 220/491
2,660,328 A * 11/1953 Averill ............................ 220/6
3,590,752 A * 7/1971 De Pew ...................... 108/55.3
3,704,791 A * 12/1972 Young, Jr. ................ 211/126.9
3,981,410 A * 9/1976 Schurch .......................... 220/6
4,079,836 A * 3/1978 Von Stein et al. ........... 206/513
4,101,049 A * 7/1978 Wallace et al. ........... 206/521.1
4,417,509 A * 11/1983 Deibel et al. .................. 99/467
5,035,326 A * 7/1991 Stahl .......................... 206/507
6,702,139 B2 * 3/2004 Bergeron .................... 220/513

(Continued)

FOREIGN PATENT DOCUMENTS

EP       0 292 417 A     11/1988

(Continued)

*Primary Examiner*—Anthony D Stashick
*Assistant Examiner*—Niki M Eloshway
(74) *Attorney, Agent, or Firm*—Lowe Hauptman Ham & Berner LLP

(57) ABSTRACT

A stackable unit includes at least one cell for carrying a foodstuff during cooking. The cell includes a pressing structure for causing pressing of a foodstuff contained in a corresponding cell of a second identical stackable unit of a lower rank, the stackable unit including a support structure for seating the stackable unit on the second identical stackable unit and a centering structure for laterally positioning the stackable unit during stacking thereof on the second identical stackable unit such that the stackable unit can be disposed vertically in line with the second stackable unit. During stacking, a guidance structure guides the stackable unit onto the second identical stackable unit in at least one plane containing the vertical stacking direction.

27 Claims, 11 Drawing Sheets

U.S. PATENT DOCUMENTS

2001/0019063 A1* 9/2001 Apps .......................... 220/771
2003/0024400 A1* 2/2003 Dreano ........................ 99/426
2003/0213718 A1* 11/2003 Ducharme et al. .......... 206/503

FOREIGN PATENT DOCUMENTS

EP          0 463 983 A    1/1992
EP          1 026 091 A    8/2000
FR          2 705 217 A    11/1994

* cited by examiner

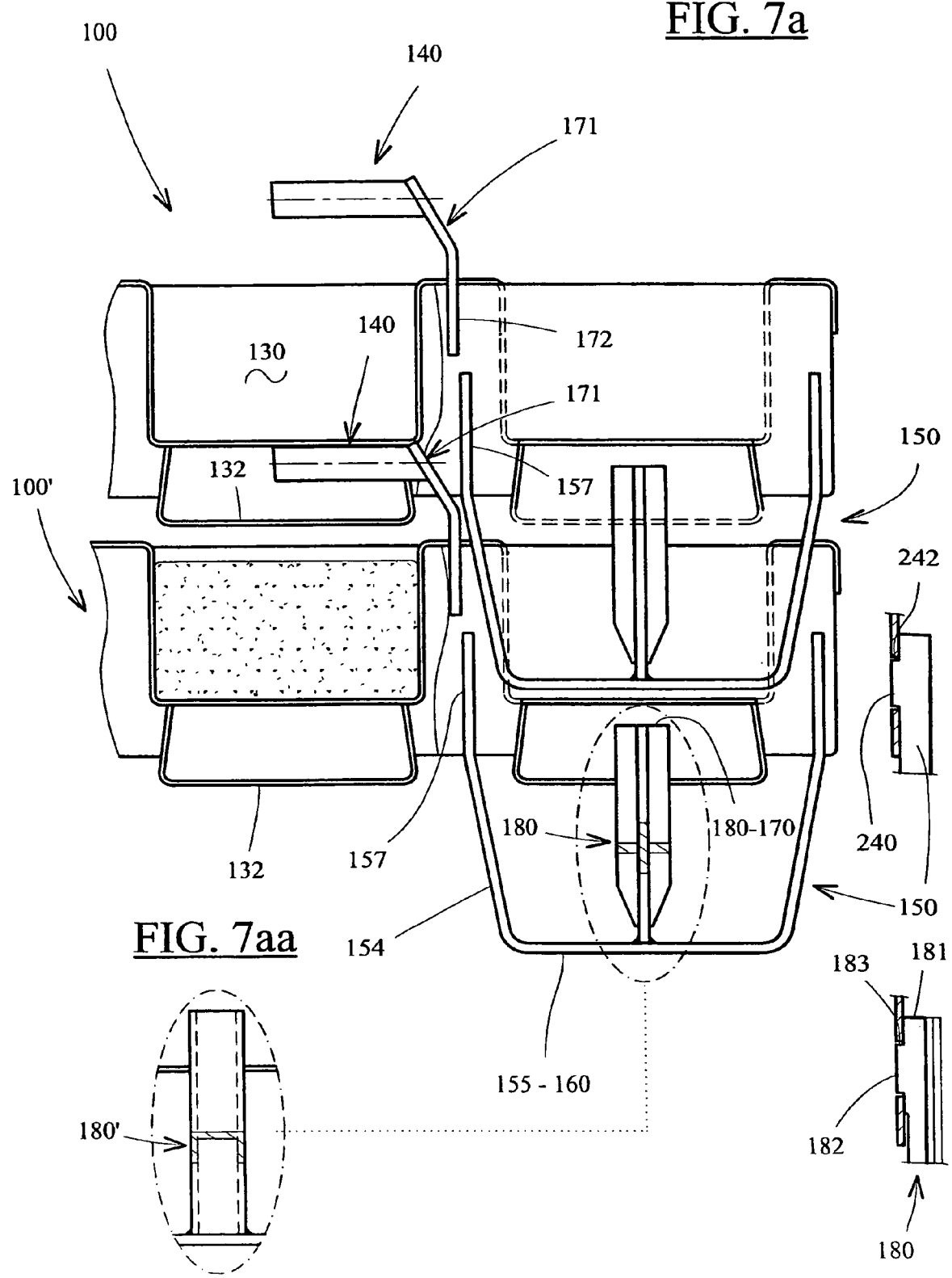

STACKING UNIT COMPRISING AT LEAST ONE CHAMBER FOR HOUSING A FOOD PRODUCT SUCH AS HAM

CROSS-REFERENCE TO RELATED APPLICATIONS

This is a U.S. National Phase and claims the benefit of the filing date of PCT/FR03/00472, filed Feb. 13, 2003, and also claims the benefit of priority under 35 U.S.C. §119 of French Application Nos. 02 02050 and 02 09405, filed respectively on Feb. 14, 2002, and Jul. 22, 2002, the entire disclosures of which are hereby herein incorporated by reference.

FIELD OF THE INVENTION

The present invention concerns a stackable unit comprising at least one cell intended to contain a foodstuff such as ham during its cooking.

BACKGROUND ART

In order to carry out the industrial cooking of ham, cooking it in a cooking chamber of relatively large volume is known. The hams are wrapped respectively in cooking bags which should be disposed in cells forming a cooking mould of a stackable unit.

When this first stackable unit is full, it serves as a support for other stackable units which in that case should be filled and then stacked successively one upon another in order to form a stack which is next transferred into a cooking chamber. In certain cases when, for example, the cooking is carried out in a cooking chamber containing a heat-conducting fluid, the stacking is performed inside the cooking chamber by means of a manipulator robot.

In order to allow the shaping of the ham during its cooking, each cell comprises on its bottom a pressing means intended to press a ham disposed in a cell of another stackable unit of a lower rank. This pressing means consists for example of a plate mounted fixed on the bottom of a cell. The last stackable unit stacked is generally empty and serves only as a pressing means for the stackable unit of the lower rank.

In view of the large mass of a stack of stackable units, it is important to position a stackable unit accurately with respect to another stackable unit of a lower rank so that the pressing means of said stackable unit can press properly, that is to say repetitively, the hams of the stackable unit of a lower rank.

Furthermore, in order to obtain gains in productivity, the manipulator robots responsible for performing the transfer of the stackable units, and in particular their stacking, work at high speed and therefore cause swaying of the stackable units which still persists at the time of their stacking.

Although equipped with positioning means, the known stackable units do not allow sufficient positioning accuracy to be obtained between them during their stacking.

SUMMARY OF THE INVENTION

The aim of the invention is therefore to propose in particular a stackable unit whose novel construction makes it possible to overcome these drawbacks.

More particularly, the invention proposes a stackable unit of the type which comprises at least one cell intended to contain a foodstuff such as ham during its cooking, said or each cell being equipped with a pressing means provided for allowing the pressing of a foodstuff contained in a corresponding cell of another identical stackable unit of a lower rank, the stackable unit being equipped with support means intended to allow the seating of the stackable unit on another identical stackable unit, and centring means intended to allow the lateral positioning of the stackable unit during its stacking on another identical stackable unit in such a way that the stackable unit can be disposed vertically in line with said other stackable unit.

In order to achieve the above-mentioned aim, this stackable unit is characterised in that it comprises guidance means provided for allowing, during the stacking of said stackable unit on another identical stackable unit, the guidance of the stackable unit in at least one plane containing the vertical stacking direction.

According to another characteristic of the invention, said guidance means are provided for guiding said unit in two planes perpendicular to each other and containing said stacking direction.

According to another characteristic of the invention, the centring means are provided for acting in two directions perpendicular to each other and perpendicular to said stacking direction.

According to another characteristic of the invention, said guidance means consist of at least one wall of each foot, said or each wall extending in a direction parallel to the stacking direction and being capable of cooperating with at least one guidance element of said unit.

According to another characteristic of the invention, each guidance element is formed on gripping means which said stackable unit comprises.

According to another characteristic of the invention, each guidance element is formed by a pin which said stackable unit comprises.

According to another characteristic of the invention, the guidance means are constituted by the rear faces of each foot, said faces being provided for cooperating respectively with plates of another stackable unit of lower rank.

According to another characteristic of the invention, the guidance means are constituted by the rear faces of arms of gripping means which said stackable unit comprises, said faces being intended to cooperate respectively with plates of another stackable unit of higher rank.

BRIEF DESCRIPTION OF THE DRAWINGS

The characteristics of the invention mentioned above, as well as others, will emerge more clearly from a reading of the following description of an example implementation, said description being given in connection with the accompanying drawings, amongst which:

FIG. 7a depicts a partial front view of a stackable unit at the beginning of the guidance phase according to another preferred embodiment of the invention;

FIG. 7aa is a partial front view of an alternate embodiment of the structure illustrated in FIG. 7a.

DETAILED DESCRIPTION OF THE DRAWINGS

The embodiments described below are in connection with the cooking of ham. It should be understood that it can apply to other types of foodstuff.

Figure 1A:
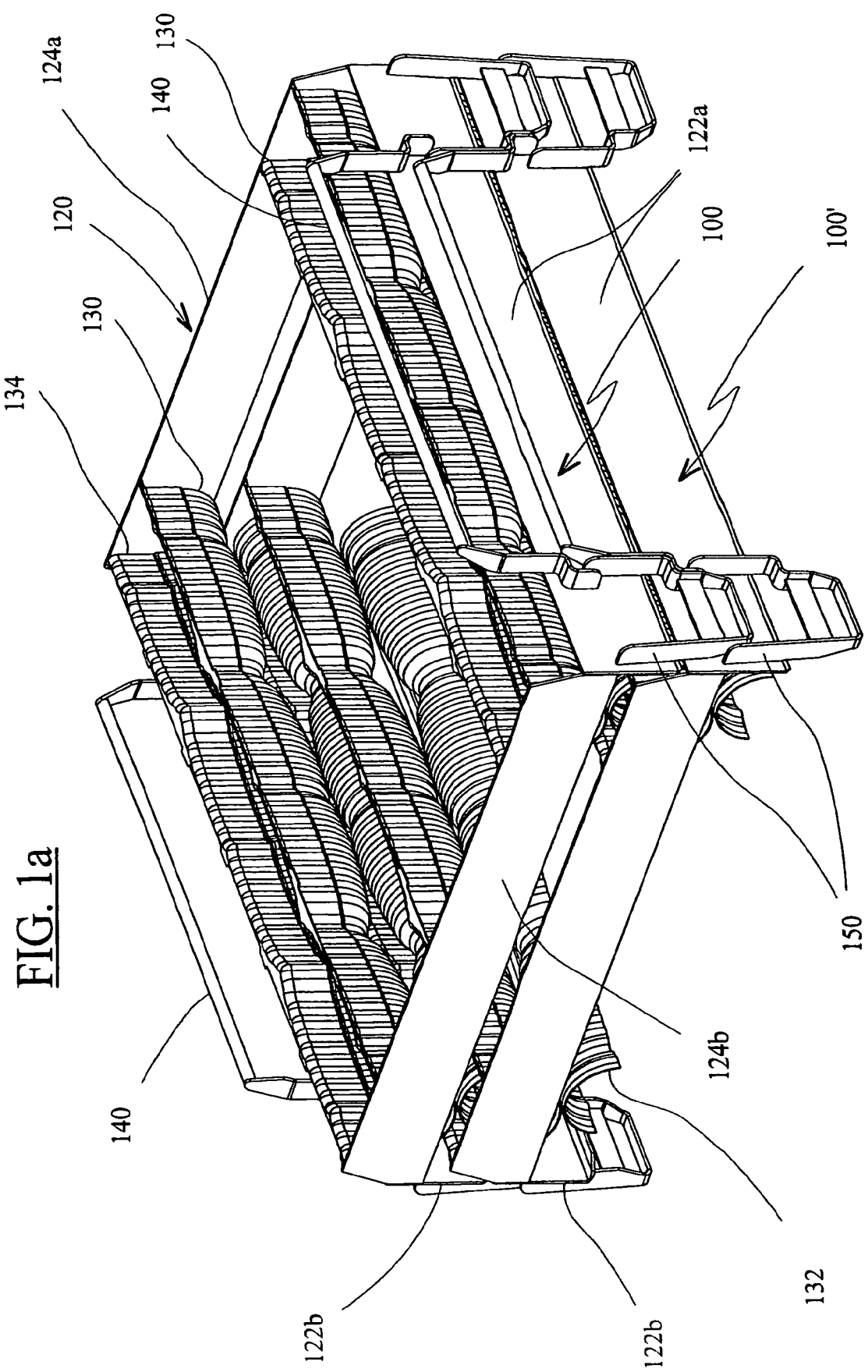
FIG. 1*a* depicts a perspective view of a stackable unit of a first type according to a preferred embodiment of the invention.

FIG. 1a depicts two stackable units 100 and 100', according to a first embodiment, stacked one upon the other. As for FIG. 1b, this also depicts two stackable units 100 and 100' but according to a second embodiment.

Figure 1B:
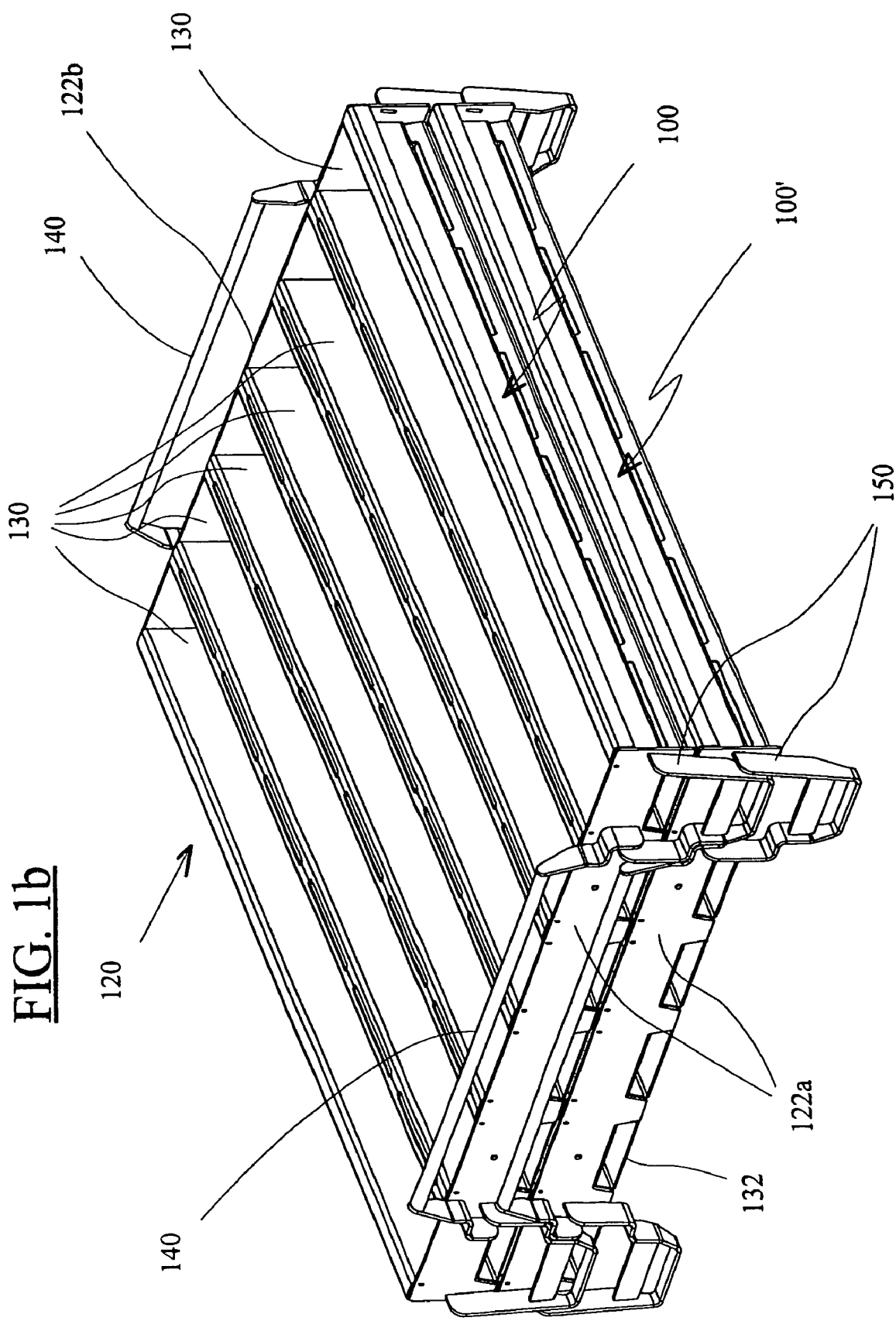
FIG. 1*b* depicts a perspective view of a stackable unit of a second type according to another preferred embodiment of the invention.

Each of the stackable units 100 and 100' depicted in FIGS. 1a and 1b comprises a frame 120 whose sides consist of two transverse plates 122a and 122b disposed facing each other. In the embodiment of FIG. 1a, the plates 122a and 122b are joined together at their ends by two longitudinal side pieces 124a and 124b. At least one cell 130 is mounted inside the frame 120 in such a way that its longitudinal axis is parallel to the transverse plates 122a and 122b in the example implementation of FIG. 1a, or perpendicular to the plates 122a and 122b in the example implementation depicted in FIG. 1b. FIG. 1a depicts, for the sake of clarity of the figure, only two cells 130, whereas FIG. 1b depicts six of them.

Each cell 130 is intended to receive a foodstuff, in particular ham, which in general, but not necessarily, is first wrapped in a cooking bag, for its cooking in a cooking chamber. Each cell 130 also comprises on its bottom a pressing means 132 consisting, for example, of a cover provided for entering another corresponding cell of a stackable unit of lower rank so as to be able to press, during its cooking, the foodstuff situated therein.

It should be noted that several stackable units 100 which are stacked one upon another are introduced into a cooking chamber.

In view of the large mass of a set of stackable units 100 (a stack of stackable units 100 can weigh several thousand kg), it is important to position a stackable unit 100 accurately during its stacking on another stackable unit 100' of a lower rank. This positioning accuracy must be such that, during the stacking of the stackable unit 100, the pressing means 132 of a cell 130 of the stackable unit 100 can uniformly press the foodstuffs J disposed in the corresponding cell 130 of the other stackable unit 100' of a lower rank.

The object of the invention is to propose means which make it possible to obtain this accurate positioning.

Figure 2:
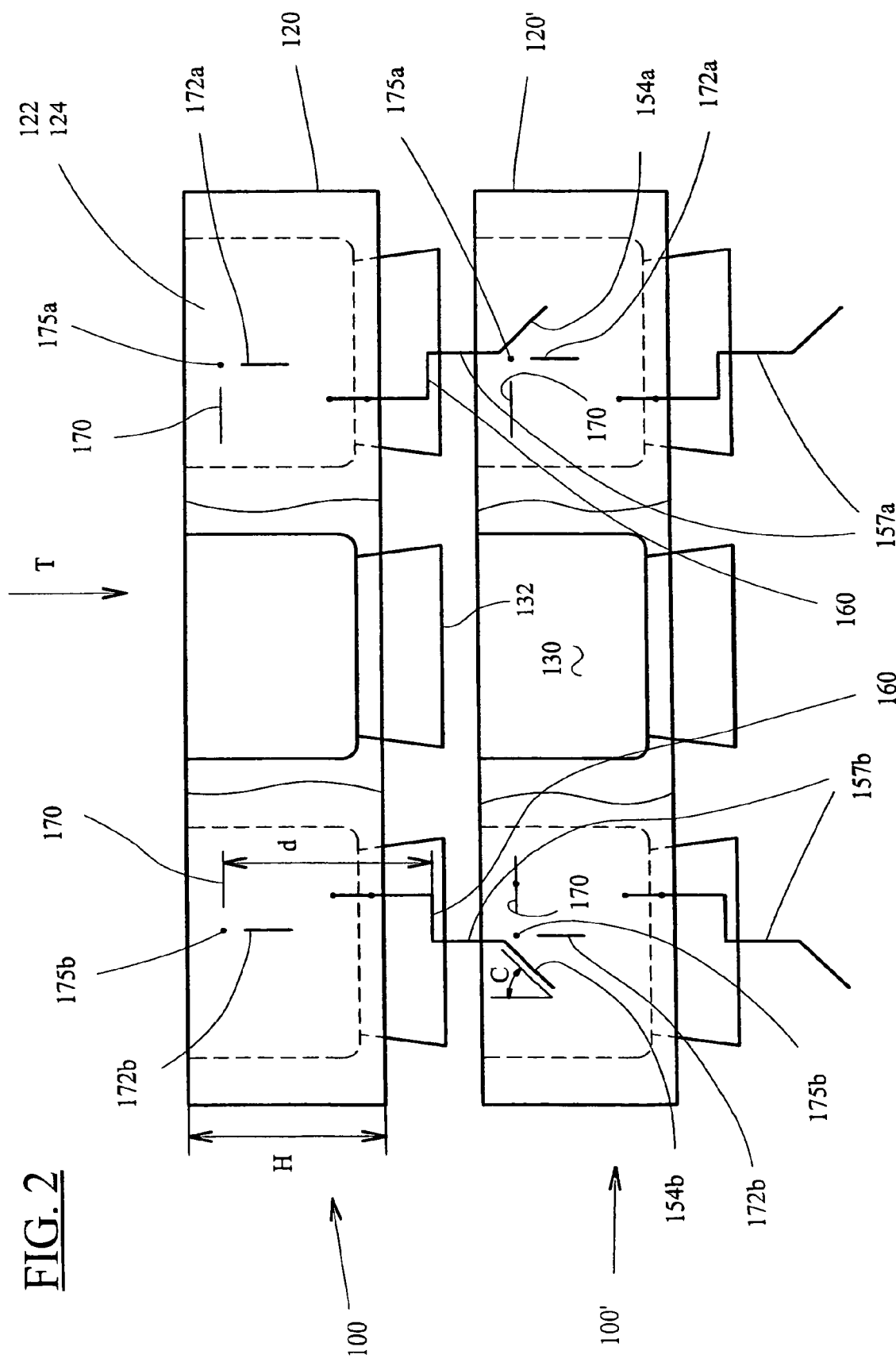
FIG. 2 depicts a schematic front view of a stackable unit in the process of being stacked on another stackable unit of a lower rank.

FIG. 2 depicts a schematic front view of a stackable unit 100 in the process of being stacked on another stackable unit 100' of a lower rank, each of said units 100 and 100' having the means of the invention. Each stackable unit 100 comprises support means 160 and 170 provided for allowing its positioning height-wise on the stackable unit 100'. The support means 160 and 170 are separate components and respectively consist of abutment means 160, here shown schematically by horizontal lines 160, and holding-up means 170, here shown schematically by other horizontal lines 170. Advantageously, four abutment means 160 and four corresponding holding-up means 170 are disposed respectively in pairs distributed over two opposite sides 122 (or 124) of the frame 120 of each stackable unit 100. Only two abutment means 160 and two holding-up means 170 are visible in FIG. 2.

It should be understood that each abutment means 160 of a stackable unit 100 is intended to cooperate with a holding-up means 170 of another stackable unit 100' of a lower rank.

The stackable unit 100 also comprises centring means intended to correct, if necessary, its lateral positioning with regard to the other stackable unit 100' during its stacking, so that the frames 120 and 120' of the stackable units 100 and 100' can be disposed in line with each other.

As can be seen in FIG. 2, the centring means consist of at least two centring ramps 154a and 154b forming respectively an acute angle C with the vertical stacking direction T and which are intended to cooperate, during a centring phase of the stacking, respectively with centring elements 175a and 175b, depicted here by simple points, of a stackable unit 100' of lower rank identical to the unit 100.

The stackable unit 100 also comprises guidance means allowing the movement in a vertical stacking direction T of the stackable unit 100 during its stacking on a stackable unit 100' in order in particular to allow said or each pressing means 132 to enter its respective cell 130 without touching it.

As can be seen in FIG. 2, these guidance means consist, on the one hand, of first guidance elements 157a and 157b and, on the other hand, of second guidance elements 172a and 172b. The first guidance elements 157a and 157b are intended to respectively slide, during a guidance phase of the stacking of the stackable unit 100 on the stackable unit 100', over the second guidance elements 172a and 172b of the stackable unit 100' of lower rank.

A description will now be given of specific embodiments of the support means, the centring means and the guidance means of the invention advantageously adapted not only to the stacking of the stackable units with one another but also to their manipulation.

In general terms, in order to allow its manipulation, for example by a manipulator robot, with a view, before cooking, to its placing on another stackable unit or, after cooking, to its withdrawal from this other stackable unit, each stackable unit 100 comprises, as depicted in FIGS. 1a and 1b, at least two gripping means 140 which are disposed respectively above the cells 130 and which are for example intended to be coupled to a lifting means, not depicted, of a manipulator robot. These gripping means 140 are for example disposed symmetrically with respect to said stackable unit 100 and are fixed respectively to two opposite sides of the frame 120, in this case to the transverse plates 122a and 122b and on the outside of the frame 120.

Figure 3:
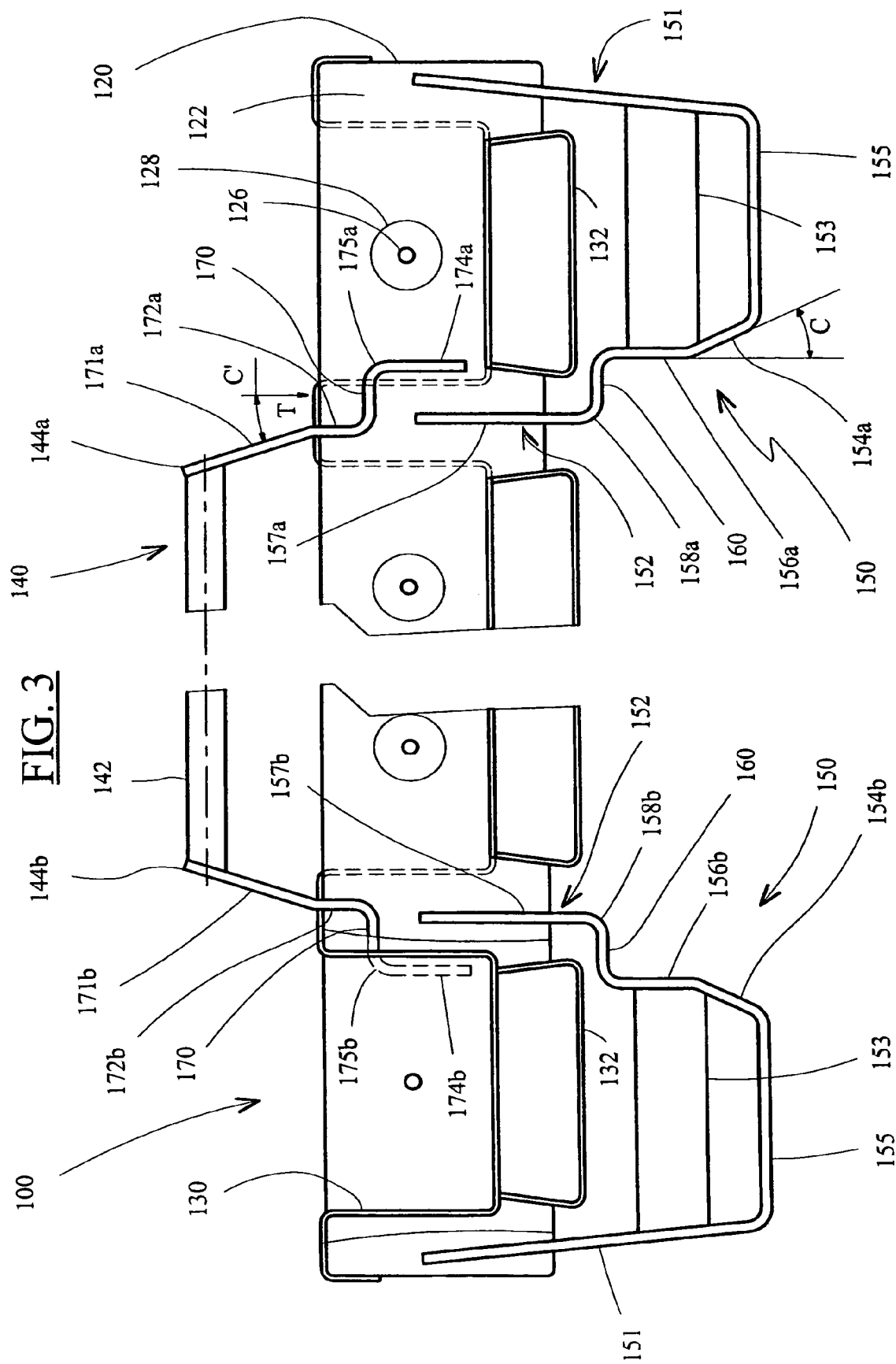
FIG. 3 depicts a front view of a stackable unit according to the invention, the left-hand part being a partial section at cell level.

FIG. 3 shows an example implementation of a gripping means 140 according to an advantageous embodiment of the invention. It consists of a bar 142 fixed at its free ends to two arms 144a and 144b consisting respectively of metal strips which are formed by folding and which are themselves fixed by welding to said opposite sides of the frame 120, in this case to the transverse plates 122a and 122b. Each arm 144a or 144b is bent so as to have a substantially horizontal part 170 which will constitute the holding-up means mentioned above in connection with FIG. 2. The horizontal part 170 of each arm 144a and 144b is continued upwards by a part 172a or 172b disposed parallel to the vertical stacking direction T which will constitute, as will be understood subsequently, guidance elements as mentioned above in connection with FIG. 2. The guidance part 172a or 172b is itself continued by an inclined part 171a or 171b which forms an acute angle C' with the vertical stacking direction T and will constitute other guidance elements as mentioned above in connection with FIG. 2. In addition, the horizontal part 170 of each arm 144a, 144b is continued downwards by a wall 174a, 174b, the bend 175 of which, formed with the part 170, will constitute, as will be understood subsequently, a centring element as mentioned above in connection with FIG. 2.

In general terms also, in order to raise a stackable unit 100 when it is resting on the ground so as to allow the passage of a lifting means, such as the forks of a lift-truck, this stackable unit 100 also comprises feet 150, as can be seen in FIGS. 1a and 1b. In reality, each stackable unit 100 comprises four feet 150 which are disposed symmetrically on the stackable unit 100 and which are fixed in pairs respectively to the same two opposite sides of the frame 120 to which the two gripping means 140 are fixed.

More specifically, as can be seen in FIG. 3, each foot 150 consists of a metallic support advantageously consisting of a metal strip folded so as to form a seating wall 155 intended to rest on the ground, and a first and second post 151 and 152. The free ends of the first post 151 and of the second post 152 are fixed, for example by welding, to one of the sides of the frame 120. The post 152 comprises, from the seating face 155, an inclined wall 154a, 154b forming an acute angle C with the stacking direction T. This wall 154a, 154b will constitute a centring ramp as mentioned above in connection with FIG. 2. This wall 154a, 154b is continued by a vertical wall 156a, 156b (constituting a guidance element), and then by an abutment wall 160 (constituting abutment means) disposed in a horizontal plane. This abutment face 160 is also continued upwards by a guidance wall 157a, 157b disposed parallel to the vertical stacking direction T and which will constitute a guidance element as mentioned above in connection with FIG. 2. At the intersection of the wall 156a, 156b with the wall 160, there is a bend 158a, 158b which, as will be understood subsequently, will constitute a centring element like that mentioned above in connection with FIG. 2.

Advantageously, in order to improve the mechanical strength of the feet 150 during stacking of the stackable units 100, the two posts 151 and 152 are not parallel to each other. The posts 151 and 152 of a foot 150 are also joined together by a reinforcing bar 153 welded by its ends to said posts 151 and 152.

The operation of a stackable unit 100, during its stacking on another stackable unit 100', is now described.

A first stackable unit 100' filled with ham ready to be cooked is available. A second stackable unit 100, also filled with ham ready to be cooked, is next stacked on the stackable unit of lower rank 100'.

Figure 4A:
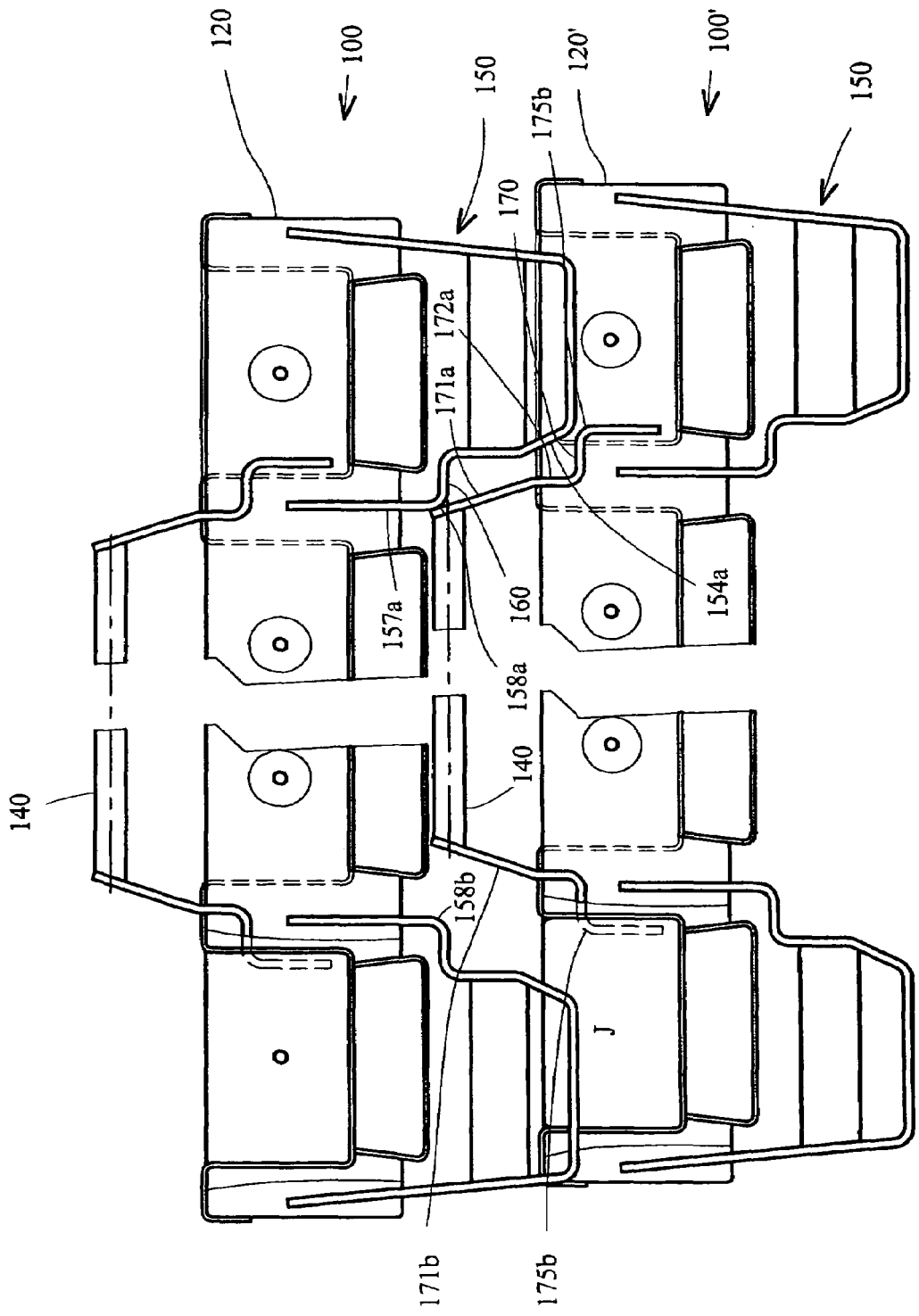
FIG. 4*a* depicts a front view of a stackable unit in the phase of centring on a stackable unit of a lower rank according to the invention.

As the stacking proceeds, the centring means come into operation, as depicted in FIG. 4a. As can be noted, the inclined walls 154a or 154b can cooperate respectively with the centring bends 175a or 175b so as to bring the stackable unit 100 back into a position where it hangs over the unit 100' of lower rank. Similarly, the inclined walls 171a or 171b can cooperate with the bends 158a or 158b of the feet 150. Thus, this makes it possible to position and centre the frame 120 of the stackable unit 100 in line with the frame 120' of the stackable unit 100'. In this way, the risks of incorrect positioning of the stackable unit 100 on the stackable unit 100' of lower rank are removed or at the very least considerably reduced.

Figure 4B:
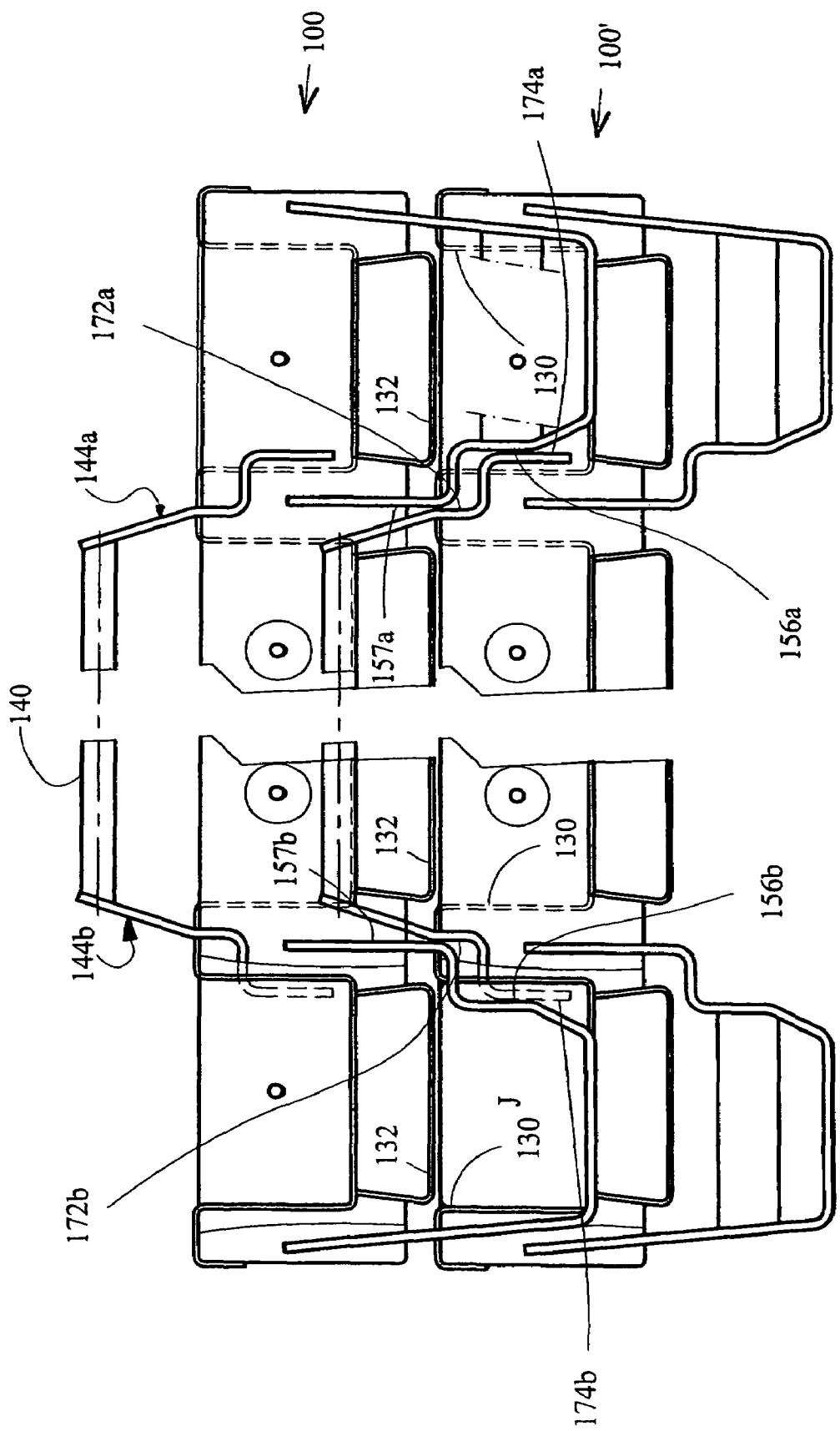
FIG. 4*b* depicts a front view of a stackable unit at the beginning of the phase of guidance onto a stackable unit of a lower rank according to the invention.

Once this centring phase has been carried out, the guidance means come into operation, as depicted in FIG. 4b. As can be noted, the walls 157a and 157b of the feet 150 slide respectively along the walls 172a and 172b of the gripping means 140. Similarly, the walls 156a and 156b of the feet 150 slide along the walls 174a and 174b of the gripping means 140. The guidance means thus allow an accurate movement in a vertical stacking direction T of the stackable unit 100 during its stacking on the stackable unit 100'. Therefore, the pressing means 132 of the stackable unit 100 can be guided at the moment of their introduction into the corresponding cells 130 of the stackable unit 100' without catching the rims of said cells 130.

Figure 4C:
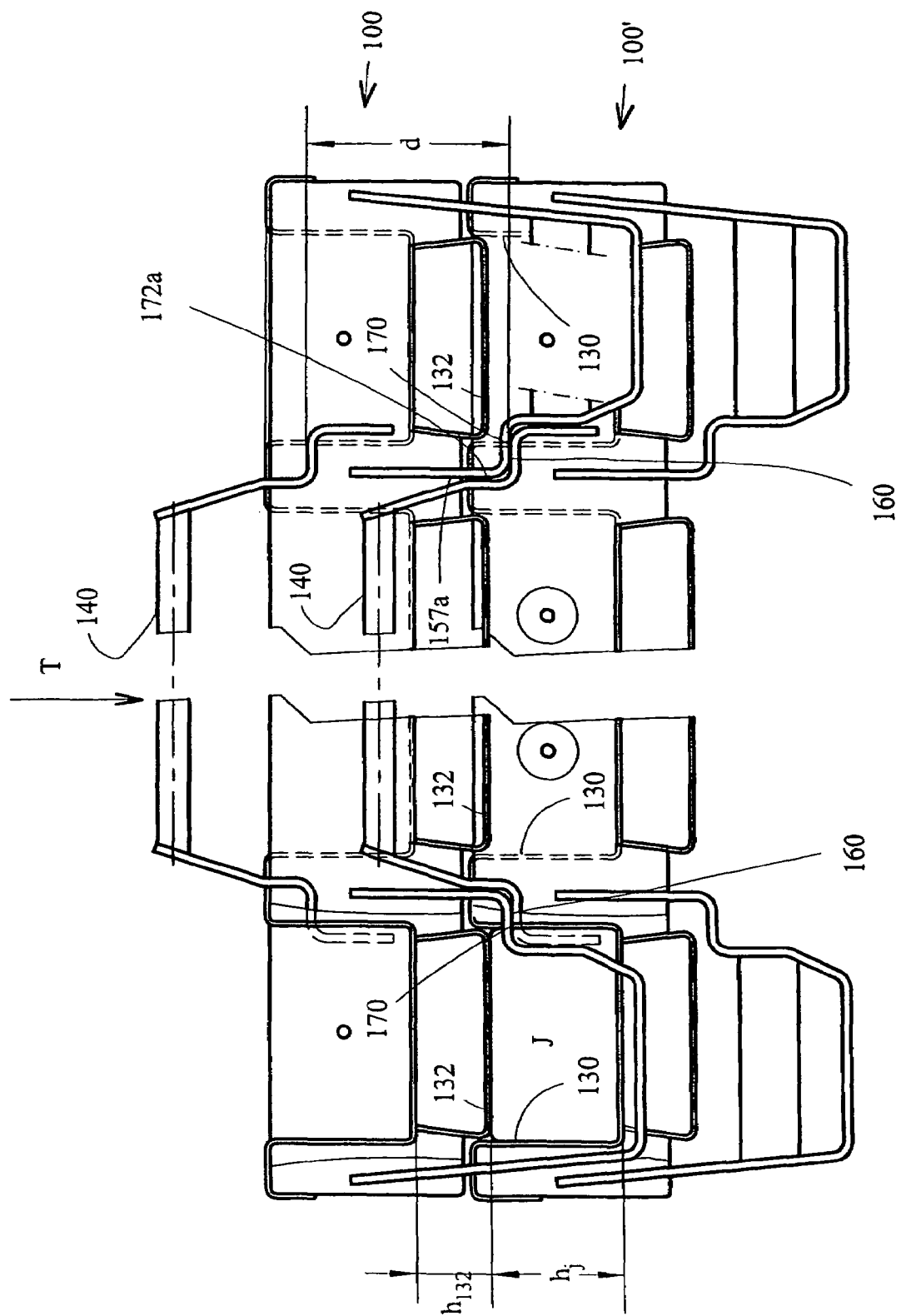
FIG. 4c depicts a front view of a stackable unit in the position of abutment on a stackable unit of a lower rank according to the invention.

At the end of the guidance phase, as can be seen in FIG. 4c, the abutment means 160 of the stackable unit 100 settle on the holding-up means 170 of the stackable unit 100' of lower rank. There, in this position, the pressing means 132 press the hams contained in the stackable unit 100'.

It should be noted that the distance d separating a plane passing through the abutment surface defined by the abutment means 160 and a plane passing through the holding-up surface defined by the holding-up means 170 is equal to the height $h_{132}$ of a cover 132 added to the height $h_j$ of the foodstuff when the latter is pressed, with the thickness of the metal sheet constituting the bottom of the cell 130 added to it, as can be seen in FIG. 4c. It should be noted that the height $h_{132}$ of the cover 132 is the name given to the distance which separates its active face and the bottom of the corresponding cell 130.

So as to provide an accurate positioning of a stackable unit 100 on another stackable unit 100', these units 100 and 100' must advantageously be able, during their stacking, to be centred and guided with respect to each another, both in a plane parallel to the walls 122a and 122b (see FIGS. 1a and 1b), and also in a plane perpendicular to these walls 122a and 122b. The invention provides such centring means and such guidance means, these means being described in connection with FIG. 5.

Figure 5:
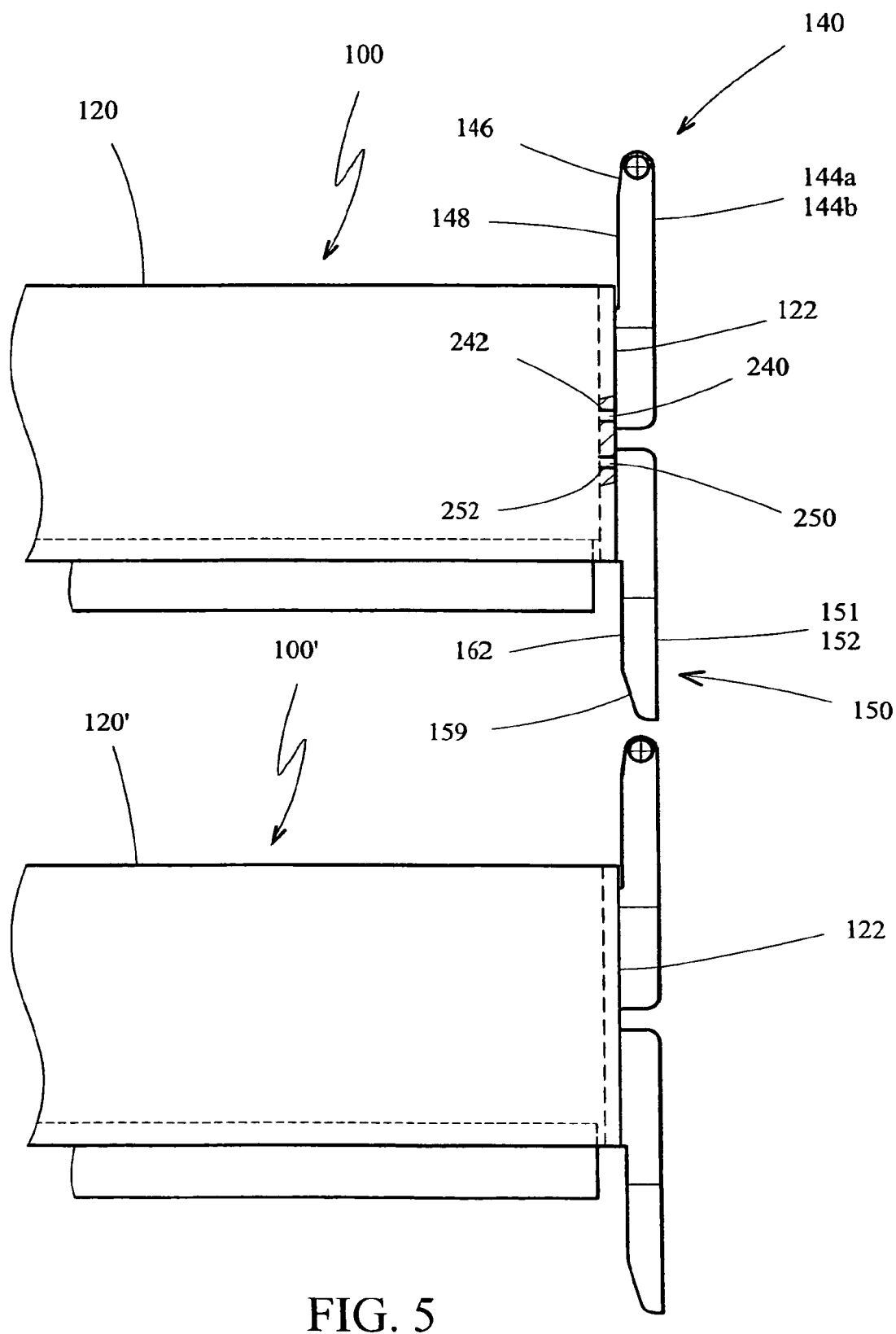
FIG. 5 depicts a partial side view of a stackable unit in the process of being stacked on another stackable unit of a lower rank according to the invention.

FIG. 5 depicts, seen from another angle, a stackable unit 100 during the phase of stacking on another stackable unit 100' of a lower rank.

The centring means consist, on the one hand, of bevelled walls 146 implemented respectively on the faces turned towards the frame 120 of the arms 144a and 144b of the gripping means 140 and, on the other hand, of bevelled walls 159 implemented respectively on the faces turned towards the frame 120 of the feet 150. The walls 146 and 159 are intended to cooperate respectively with the lower edges of the sides of the frame of a stackable unit of higher rank and with the upper edges of the sides of the frame 120' of a stackable unit 100' of lower rank.

As for the guidance means, these are constituted, on the one hand, by the rear faces 148 of the arms 144a, 144b of each gripping means 140 and, on the other hand, by the rear faces 162 of each foot 150. The rear faces 148 and 162 are intended to cooperate respectively with sides of the frame 120 of a stackable unit of higher rank and sides of the frame 120 of a stackable unit 100' of lower rank.

The rear faces 148 and 162 thus make it possible to guide the stackable unit 100 during its stacking on a stackable unit 100' of lower rank. The rear faces 148 and 162 are also offset from the faces of the sides of the frame 120 to which they are welded in order to lead to play necessary for the guidance and also avoid the jamming of the arms 144a and 144b and the posts 151 and 152 on fixing welds for the arms 144a and 144b and posts 151 and 152 of another stackable unit of higher rank or of lower rank.

So as to allow an accurate relative positioning of the gripping means 140 and the feed 150 on the stackable unit 100 before welding them thereto, the arms 144a and 144b and the posts 151 and 152 comprise, respectively, as can be seen in FIG. 5, centering studs 240 and 250, which are intended to be positioned respectively in corresponding holes 242, 252, implemented in sides of the frame 120. These centring studs 240 and 250 are advantageously implemented in the metal strips which constitute the feet 150 and the gripping means 140 by a laser cutting method.

Figure 6:
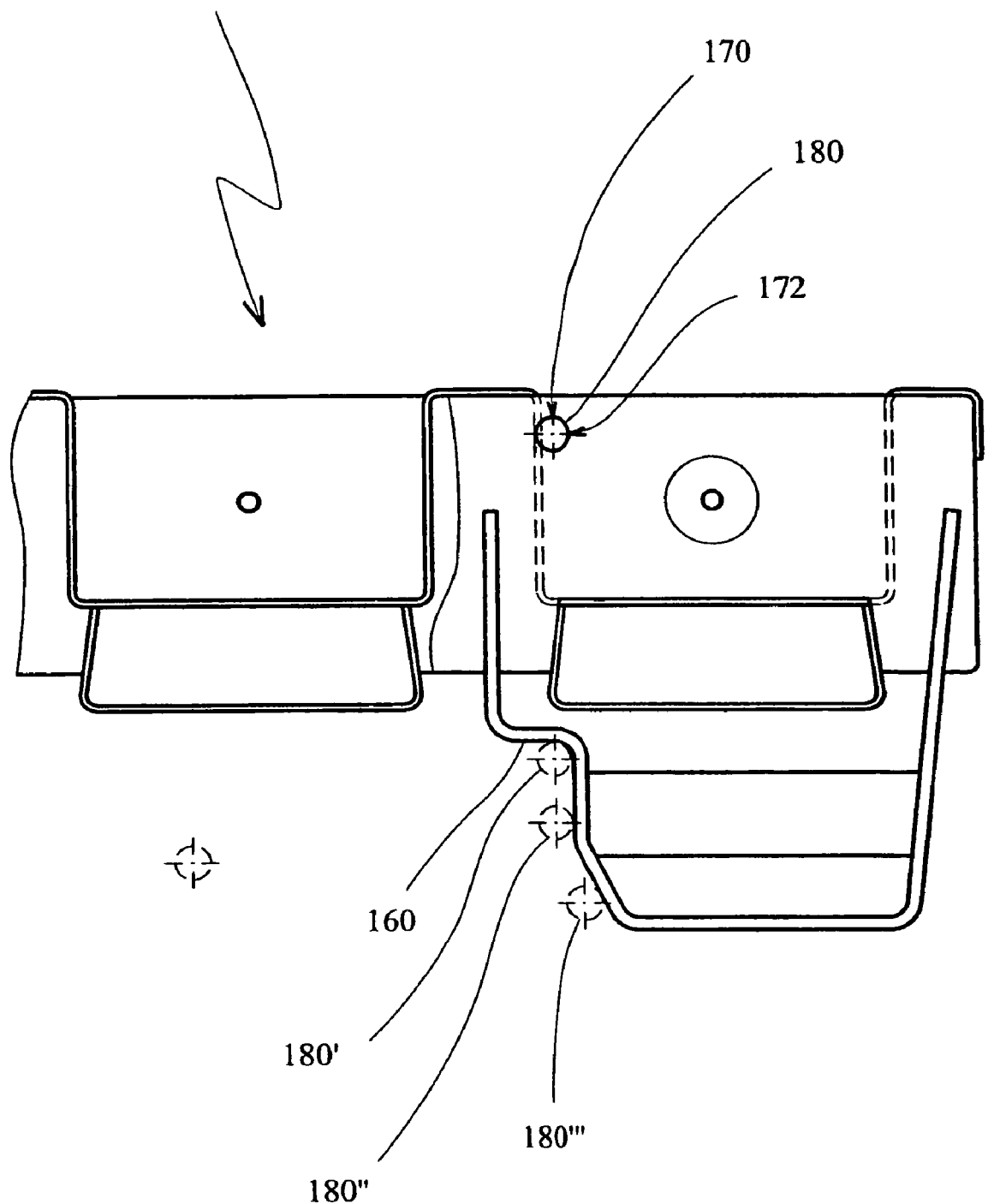
FIG. 6 depicts a partial front view of a stackable unit equipped with a variant implementation of guidance means.

FIG. 6 depicts a variant implementation of a stackable unit 100 not comprising gripping means as in the preceding embodiment. In this embodiment, the holding-up means 170 are embodied by a generator of a pin 180, this generator being intended to receive the wall 160 of a foot 150 of a stackable unit of higher rank. There has been depicted in dotted lines the pin 180' of a stackable unit 100' (not depicted) on which the wall 160 rests. It therefore constitutes, with the wall 160, holding-up means according to the present invention. Similarly, a generator 172 of the pin 180 is provided in order to be able to slide along the wall 156a, 156b of a foot 150 (as shown schematically by the pin 180" in dotted lines). It then constitutes guidance means according to the invention. This same pin 180 is also intended to slide along the wall 154 of a foot 150, as shown schematically by the pin 180''' in dotted lines. It therefore also constitutes centring means according to the invention.

Figure 7B:
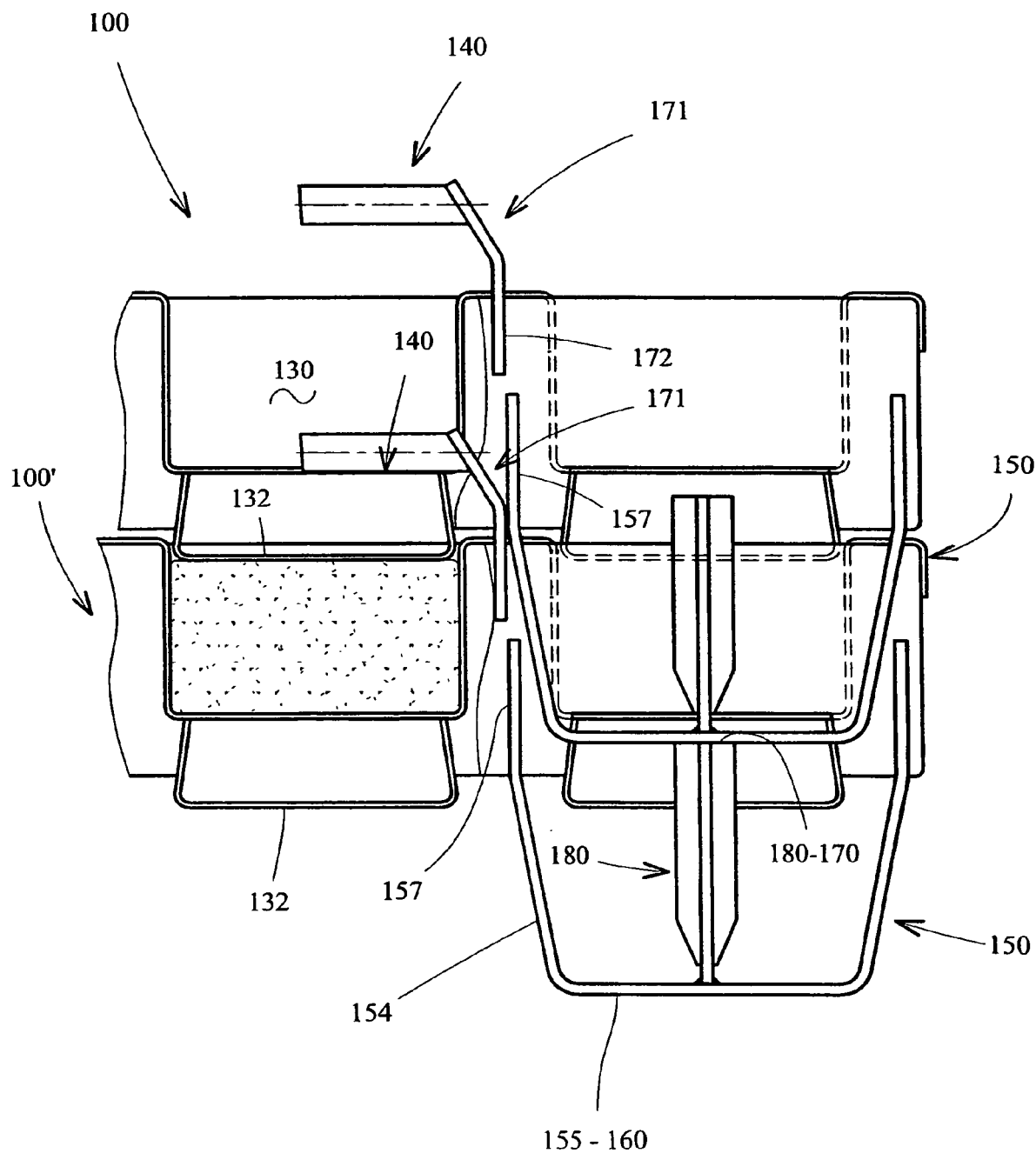
FIG. 7b depicts a partial front view of the same stackable unit in the abutment position.

FIGS. 7a and 7b depict another embodiment of a stackable unit (here two units 100 and 100' in the process of being stacked in FIG. 7a and stacked in FIG. 7b) according to the present invention. Each unit comprises feet 150 which have the shape of a U with the corners slightly truncated. They comprise in particular a guidance element 157. These feet 150 have the advantage of having a symmetrical shape so that a right foot can also be suitable for a left foot and vice versa.

Each stackable unit also comprises gripping means 140 which comprise an inclined wall 171 which constitutes means of centring the unit in order to provide its lateral positioning with respect to another lower stackable unit during its stacking thereon.

The gripping means 140 also comprise a guidance element 172 which is intended to cooperate with the guidance element 157 so as to slide with respect to each other during a phase of guidance of the stackable unit 100 during its stacking on the stackable unit 100', as can be seen in FIG. 7a. It should be noted that this guidance phase takes place after the centring phase and before the seating of the unit 100 on the unit 100' and that it allows each pressing means 132 to enter its respective cell 130 without touching it.

Each foot 150 also comprises a seating wall 155 which, as will be understood, also constitutes an abutment means 160 in the sense of the preceding embodiments (this explains its dual reference).

Inside each foot 150 there is provided a pillar 180 substantially parallel to the stacking direction whose lower end is fixed to the seating wall 155 and whose upper end 181 constitutes the holding-up means 170 in the sense of the preceding embodiments (this explains its dual reference).

As can be noted in FIG. 7b, the lower face of the seating wall 155 of the stackable unit 100 rests on the upper end 181 of the pillar 180. The one and the other therefore clearly respectively constitute abutment means and holding-up means.

The advantages resulting from this embodiment are as follows. The double bends which characterise the feet 150 and the gripping means 140 of the preceding embodiments can prove difficult to implement if accuracy in the positioning of a stackable unit with respect to the one situated below it is sought, an accuracy which, for example, can be of the order of a tenth of a millimetre. However, this embodiment does not have these double bends. Moreover, the positioning accuracy is provided by the fact that it is relatively easy to implement the pillar 180 with great accuracy, of the order of 1/10 mm, in particular its height. Now, it is this height which determines the positioning between two stackable units: the distance which separates two stackable units which are stacked one upon the other is equal to the height of the pillar 180 added to the thickness of the metal sheet which constitutes the seating wall 155.

According to an advantageous embodiment of a pillar 180, the latter has a cross-shaped section which has the effect of increasing its inertia and its resistance to bending. Furthermore, its end resting on the seating wall 155 is tapered so as to make its lower end accessible for cleaning.

A variant implementation of the pillar 180 is depicted as pillar 180' in the inset of FIG. 7aa. Pillar 180' has a U-shaped section for the same reasons as those mentioned above. Similarly, the lower ends of the wings of the U are tapered.

As can be noted in the insets accompanying FIG. 7a, the feet 150 comprise centring studs 240 going into positioning holes 242 whose dimensions are such that there is a relatively large amount of play in the direction parallel to the stacking direction. As for the pillar 180, it comprises a centring stud 182 going into a positioning hole 183 with no play. It is therefore the pillar 180 which provides the accurate positioning of the seating wall 155 relative to the frame of the stackable unit under consideration.

In order that each foot 150 which is disposed on the frame 120 obstructs none of the ends of the pressing means 132, which would make their cleaning difficult, for example, with a high-pressure washing appliance, the distance separating the first post 151 from the second post 152 of a foot 150 is greater than the width of a pressing means 132 (see FIGS. 3 and 6).

For the same reasons, the arms 144a and 144b of the gripping means 140 as well as the posts 151 and 152 of the feet 150 are mounted on edge on the frame 120 and are for example welded thereto.

The stackable unit 100 also comprises holes 126 (see in particular FIG. 3) implemented through the sides of the frame 120, and in this case the transverse plates 122, so as to allow the passage of a sensor into the cells 130 in order to measure, in particular, the cooking temperature inside the ham J.

The presence of projections 128 which are formed on sides of the frame 120 towards the outside of the stackable unit 100 should also be noted. These projections 128 make it possible to house the sealed ends of some cooking bags P1.

Furthermore, and in order to meet the wishes of consumers, it seemed advantageous to offer hams of different sizes which should be cooked in stackable units of different types whose cells 130 have a shape and dimensions which are different from one type of stackable unit to another.

Thus, the stackable units 100 depicted in FIG. 1a are of a first type, in which each cell 130 has a bottom of rounded section, and each pressing means 132 has an abutment face also of rounded section. Each cell 130 of this stackable unit 100 has a very high rim 134, which forces guidance of the pressing means 132 for longer. On the other hand, the stackable units 100 depicted in FIG. 1b are of a second type, in which each cell 130 has a prismatic section, and each pressing means 132 has a flat abutment face.

The stackable unit of the invention consists essentially of standard elements common to the different types of stackable unit.

Its manufacturing cost is lower than that of a known stackable unit.

It makes it possible to obtain great accuracy of pressing of hams during their cooking.

The invention claimed is:

1. A stackable unit comprising at least one cell for carrying a foodstuff during cooking, said at least one cell including a pressing structure for causing pressing of a foodstuff contained in a corresponding cell of a second identical stackable unit of a lower rank, the stackable unit including a support structure for seating the stackable unit on the second identical stackable unit, a centering structure for laterally positioning the stackable unit during stacking thereof on the second identical stackable unit in such a way that the stackable unit can be disposed vertically in line with said second stackable unit, and a guidance structure for guiding, after the lateral positioning and during stacking of said stackable unit on the second identical stackable unit, the stackable unit in at least one plane containing the vertical stacking direction, the support structure including a seating wall having a foot having the shape of a U and a pillar (a) substantially parallel to the stacking direction resting on said seating wall and (b) having a height equal to the distance between two stackable units minus the thickness of the seating wall, the seating wall of a stackable unit being arranged to rest on the free end of a pillar of another stackable unit on which the stackable unit is arranged to rest, said pillar comprising a centering stud arranged to enter without play into a positioning hole which the frame forming said stackable unit comprises, said pillar having a U-shaped section, and said foot including a centering stud centered with play parallel to the stacking direction in a positioning hole which the frame forming said stackable unit comprises.

2. The stackable unit of claim 1, wherein said guidance structure is arranged for guiding said unit in two planes perpendicular to each other and containing said stacking direction.

3. The stackable unit of claim 1, wherein the centering structure is arranged for acting in two directions perpendicular to each other and perpendicular to said stacking direction.

4. The stackable unit of claim 1, wherein said guidance structure includes at least one wall having a foot, said at least one wall extending in a direction parallel to the stacking direction and being arranged for cooperating with at least one guidance element of said unit.

5. The stackable unit of claim 4, wherein the guidance structure is formed on a gripping structure.

6. The stackable unit of claim 4, wherein the guidance structure includes a pin.

7. The stackable unit of claim 1, wherein the centering structure includes at least two walls forming an arcuate angle with the vertical stacking direction, said walls being arranged to respectively cooperate with centering elements.

8. The stackable unit of claim 7, wherein the centering elements include bends on a gripping structure of said unit.

9. The stackable unit of claim 8, wherein the centering elements include pins which said unit includes.

10. The stackable unit of claim 8, wherein said walls are formed in feet of said unit.

11. The stackable unit of claim 7, wherein the unit includes feet and wherein the centering elements include bends which said feet of said unit include.

12. The stackable unit of claim 7, wherein the unit includes a gripping structure and wherein the centering structure includes at least two walls of said gripping structure which said unit includes.

13. The stackable unit of claim 1, wherein the unit includes a frame including feet and wherein the centering structure includes beveled walls respectively located on the faces turned towards said frame and which are intended to cooperate respectively with the upper edges of the sides of the frame of the second stackable unit.

14. The stackable unit of claim 1, wherein the unit includes a frame including a gripping structure and wherein the centering structure includes beveled walls respectively located on the faces turned towards said frame and arranged to cooperate respectively with the lower edges of the sides of the frame of another stackable unit of higher rank.

15. The stackable unit of claim 1, wherein said pillar has a cross-shaped cross-section.

16. The stackable unit of claim 1, wherein said pillar has a U-shaped section.

17. The stackable unit of claim 1, wherein said stackable unit comprises a frame including a positioning hole and wherein said pillar comprises a centering stud arranged to enter without play into said positioning hole.

18. The stackable unit of claim 1, wherein the unit comprises a gripping structure including arms and feet, each of the arms and each foot respectively including folded metal strips welded to opposite sides of a frame.

19. The stackable unit of claim 18, wherein the each foot comprises a first post and a second post joined by a reinforcing bar welded by its ends to said posts.

20. The stackable unit of claim 18, wherein said metal strips included on said arms and said foot are fixed on edges on the frame.

21. The stackable unit of claim 1 wherein the unit includes a frame with sides having openings for enabling passage of a sensor into the cells.

22. The stackable unit of claim 1, further including projections extending towards the outside of the stackable unit, the projections enabling the unit to house sealed ends of some cooking bags.

23. The stackable unit of claim 1, wherein the guiding structure includes feet having posts that are not parallel to each other.

24. The stackable unit of claim 1, wherein the guiding structure includes feet having posts, the distance separating a first post of the posts from a second post of the posts being greater than the width of the pressing structure.

25. A stackable unit comprising at least one cell for carrying a foodstuff during cooking, said at least one cell including a pressing structure for causing pressing of a foodstuff contained in a corresponding cell of a second identical stackable unit of a lower rank, the stackable unit including a support structure for seating the stackable unit on the second identical stackable unit, a centering structure for laterally positioning the stackable unit during stacking thereof on the second identical stackable unit in such a way that the stackable unit can be disposed vertically in line with said second stackable unit, and a guidance structure for guiding, after the lateral positioning and during stacking of said stackable unit on the second identical stackable unit, the stackable unit in at least one plane containing the vertical stacking direction, said guidance structure including at least one wall having a foot, said at least one wall extending in a direction parallel to the stacking direction and being arranged for cooperating with at least one guidance element of said unit, the guidance structures including the rear faces of each foot, each of said rear faces being arranged for cooperating respectively with plates of another stackable unit of lower rank.

26. A stackable unit comprising at least one cell for carrying a foodstuff during cooking, said at least one cell including a pressing structure for causing pressing of a foodstuff contained in a corresponding cell of a second identical stackable unit of a lower rank, the stackable unit including a support structure for seating the stackable unit on the second identical stackable unit, a centering structure for laterally positioning the stackable unit during stacking thereof on the second identical stackable unit in such a way that the stackable unit can be disposed vertically in line with said second stackable unit, and a guidance structure for guiding, after the lateral positioning and during stacking of said stackable unit on the second identical stackable unit, the stackable unit in at least one plane containing the vertical stacking direction, the guidance structure including a rear face having arms of a gripping structure which said stackable unit comprises, said faces being arranged to cooperate respectively with plates of another stackable unit of higher rank.

27. A stackable unit comprising at least one cell for carrying a foodstuff during cooking, said at least one cell including a pressing structure for causing pressing of a foodstuff contained in a corresponding cell of a second identical stackable unit of a lower rank, the stackable unit including a support structure for seating the stackable unit on the second identical stackable unit, a centering structure for laterally positioning the stackable unit during stacking thereof on the second identical stackable unit in such a way that the stackable unit can be disposed vertically in line with said second stackable unit, and a guidance structure for guiding, after the lateral positioning and during stacking of said stackable unit on the second identical stackable unit, the stackable unit in at least one plane containing the vertical stacking direction, said support structure comprising an abutment and holding-up structure, the pressing structure including a cover, the bottom of the at least one cell including a metal sheet, and the distance separating a plane passing through said abutment and a plane passing through said holding-up structure being equal to the height of said cover added to the height of the foodstuff pressed by said cover which is situated in the corresponding cell, with the thickness of said metal sheet added to it.

* * * * *